US010628615B2

(12) United States Patent
Krithivas et al.

(10) Patent No.: US 10,628,615 B2
(45) Date of Patent: *Apr. 21, 2020

(54) ASSET PROTECTION OF INTEGRATED CIRCUITS DURING TRANSPORT

(71) Applicant: Intel Corporation, Santa Clara, CA (US)

(72) Inventors: Ramamurthy Krithivas, Chandler, AZ (US); Donald C. Soltis, Jr., Windsor, CO (US); Bradley Burres, West Newton, MA (US)

(73) Assignee: Intel Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/984,699

(22) Filed: May 21, 2018

(65) Prior Publication Data
US 2019/0087610 A1 Mar. 21, 2019

Related U.S. Application Data

(63) Continuation of application No. 14/927,973, filed on Oct. 30, 2015, now Pat. No. 9,996,711.

(51) Int. Cl.
*G06F 21/72* (2013.01)
*G06F 21/88* (2013.01)
(Continued)

(52) U.S. Cl.
CPC .............. *G06F 21/88* (2013.01); *G06F 21/44* (2013.01); *G06F 21/72* (2013.01); *G06F 21/74* (2013.01); *G06F 8/60* (2013.01)

(58) Field of Classification Search
None
See application file for complete search history.

(56) References Cited

U.S. PATENT DOCUMENTS 5,708,715 A * 1/1998 Vicard ................. G06F 21/572
713/170
5,892,906 A * 4/1999 Chou ...................... G06F 21/31
713/2
(Continued)

FOREIGN PATENT DOCUMENTS

WO    WO-2013060940 A2    5/2013
WO    WO-2017074628 A1    5/2017

OTHER PUBLICATIONS

"U.S. Appl. No. 14/927,973, Examiner Interview Summary dated Aug. 1, 2017", 3 pgs.
(Continued)

*Primary Examiner* — Fatoumata Traore
(74) *Attorney, Agent, or Firm* — Schwegman Lundberg & Woessner, P.A.

(57) ABSTRACT

An integrated circuit (IC) provisioned for asset protection has a primary circuit portion, such as a microprocessor or system-on-chip, that can be selectively disabled and enabled via an operability control input. The IC includes a secure register to store lock state indicia and unlock criteria, where a signal at the operability control input is responsive to the lock state indicia. In operation, a firmware data store receives and stores firmware code that includes a lock/unlock command, and firmware data that includes an unlock key. An authorization module verifies authenticity of the firmware code. A lock/unlock (LUL) module is operative to write lock state indicia to the secure register based on the lock/unlock command only in response to a positive verification of the authenticity of the firmware code by the authorization module, and to write lock state indicia to the secure register.

19 Claims, 5 Drawing Sheets

(51) Int. Cl.
    *G06F 21/74*    (2013.01)
    *G06F 21/44*    (2013.01)
    *G06F 8/60*     (2018.01)

(56) References Cited

U.S. PATENT DOCUMENTS

| | | | |
|---|---|---|---|
| 9,996,711 B2 | 6/2018 | Krithivas et al. | |
| 2009/0094421 A1 | 4/2009 | Lewis | |
| 2009/0222653 A1* | 9/2009 | Findeisen | G06F 21/575 |
| | | | 713/2 |
| 2010/0287374 A1 | 11/2010 | Roy et al. | |
| 2012/0102576 A1 | 4/2012 | Chew | |
| 2014/0044265 A1 | 2/2014 | Kocher et al. | |
| 2015/0095644 A1 | 4/2015 | Gupta et al. | |
| 2016/0224810 A1* | 8/2016 | Shahidzadeh | H04L 9/3242 |
| 2017/0124358 A1 | 5/2017 | Krithivas et al. | |

OTHER PUBLICATIONS

"U.S. Appl. No. 14/927,973, Non Final Office Action dated Jun. 22, 2017", 21 pgs.

"U.S. Appl. No. 14/927,973, Notice of Allowance dated Feb. 14, 2018", 16 pgs.

"U.S. Appl. No. 14/927,973, Response filed Oct. 23, 2017 to Non Final Office Action dated Jun. 22, 2017", 9 pgs.

"International Application Serial No. PCT/US2016/053753, International Preliminary Report on Patentability dated May 11, 2018", 10 pgs.

"International Application Serial No. PCT/US2016/053753, International Search Report dated Dec. 19, 2016", 3 pgs.

"International Application Serial No. PCT/US2016/053753, Written Opinion dated Dec. 19, 2016", 8 pgs.

Skochinsky, Igor, "Intel ME Secrets", (2014), 50 pgs.

* cited by examiner

ASSET PROTECTION OF INTEGRATED CIRCUITS DURING TRANSPORT

PRIORITY

This application is a continuation of U.S. patent application Ser. No. 14/927,973 filed Oct. 30, 2015, now issued as U.S. Pat. No. 9,996,711, which is incorporated by reference herein in its entirety.

TECHNICAL FIELD

Embodiments described herein generally relate to manufacture and distribution of integrated circuits (ICs) and product assemblies or subassemblies incorporating ICs and, more particularly, to configuring ICs with security features to deter theft.

BACKGROUND

Advanced integrated circuits (ICs) such as microprocessors and system-on-chip (SoC) devices are valuable components that oftentimes represent a significant fraction of the cost of the end-products into which they are incorporated. The wide market reach of IC manufacturers in their role as parts suppliers for international supply and distribution chains exposes the manufacturers, distributors, original equipment manufacturers, and other commercial participants along the supply/distribution chains of ICs to the risk of losses resulting from theft of if the ICs during transportation or warehousing.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems, methods, and articles of manufacture described herein provide security solutions that operate to deter theft of ICs or products or subassemblies that incorporate ICs. Examples of ICs for which such protection is applicable include microprocessors, systems-on-chip (SoC) devices, certain application-specific integrated circuits (ASICs), memory devices, and other advanced components. In the present context, the term IC refers to integrated circuits at various stages of manufacture and application. For instance, ICs may encompass packaged devices ready to be mounted in circuit card assemblies, un-packaged fabricated dies to be packaged in subsequent manufacturing steps, and ICs mounted on a circuit card assembly that may be an end product or a subassembly of an end product, such as a motherboard or video card for a personal computer.

Figure 1:
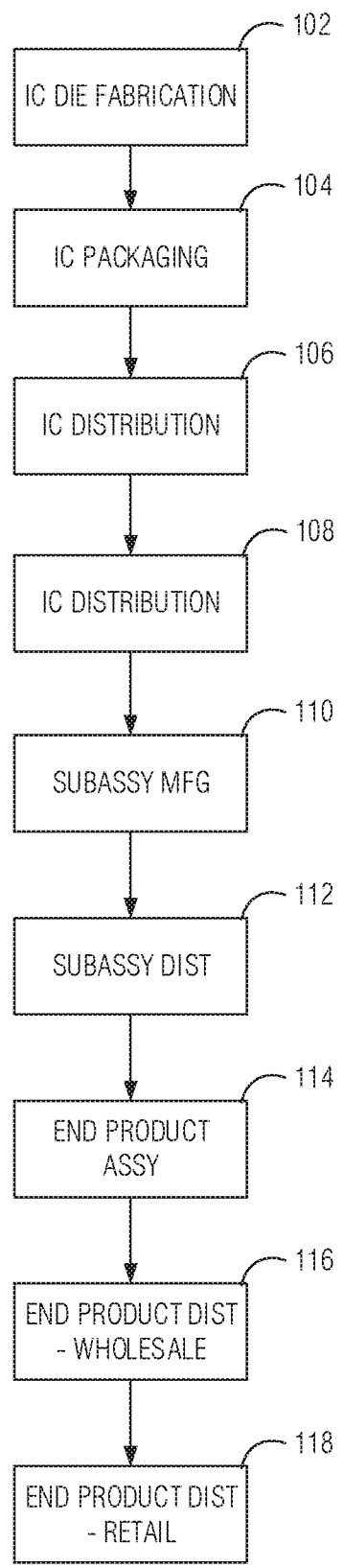
FIG. 1 is a flow diagram illustrating an exemplary production flow for an IC.

FIG. 1 is a flow diagram illustrating an exemplary production flow for an IC. Stages of the production flow may be carried out by different entities that transact with one another. The entities may be original or contract manufacturers, participants in sales and distribution channels, original equipment manufacturers, wholesalers, retailers, and, the like. As illustrated in this simplified example, IC die fabrication at 102 is followed by packaging of the die at 104, which may be carried out at one or more factories. Packaged ICs are sent to distribution at 106 and 108, illustrating that distribution may be carried out at multiple stages. Subassembly fabrication is performed at 110, followed by subassembly distribution at 112 to end-product assemblers operating at 114. The assembled end products are distributed to wholesalers at 116 and, later, to retailers at 118. The arrows in FIG. 1 between each block represent transfer of the ICs from one stage of production/distribution to the next. Each transfer point may be accompanied by storage/warehousing and transportation, each of which presents a security concern in which ICs may be misappropriated to be re-sold in black markets or re-introduced as stolen goods into conventional markets unbeknownst to prospective purchasers.

According to one aspect of the disclosure, security is provided by disabling core functionality of the IC in such a way that only an authorized participant of the supply/distribution chain is able to restore the functionality. Accordingly, while ICs are in transit from one stage of production or distribution to another, the IC functionality is locked. At a destination, such as at an original equipment manufacturer (OEM), the IC functionality is unlocked so that the IC may be operated, tested, etc.

In an embodiment, the locking and unlocking of the IC is achieved through specialized writing of firmware code into the IC. A related aspect of the disclosure recognizes that provision of firmware code installation ability by third party actors other than the original die manufacturer introduces a susceptibility that could be exploited by malicious actors. Accordingly, various embodiments provide for secure handling and isolation of added firmware code that is used for locking and unlocking the IC.

Figure 2:
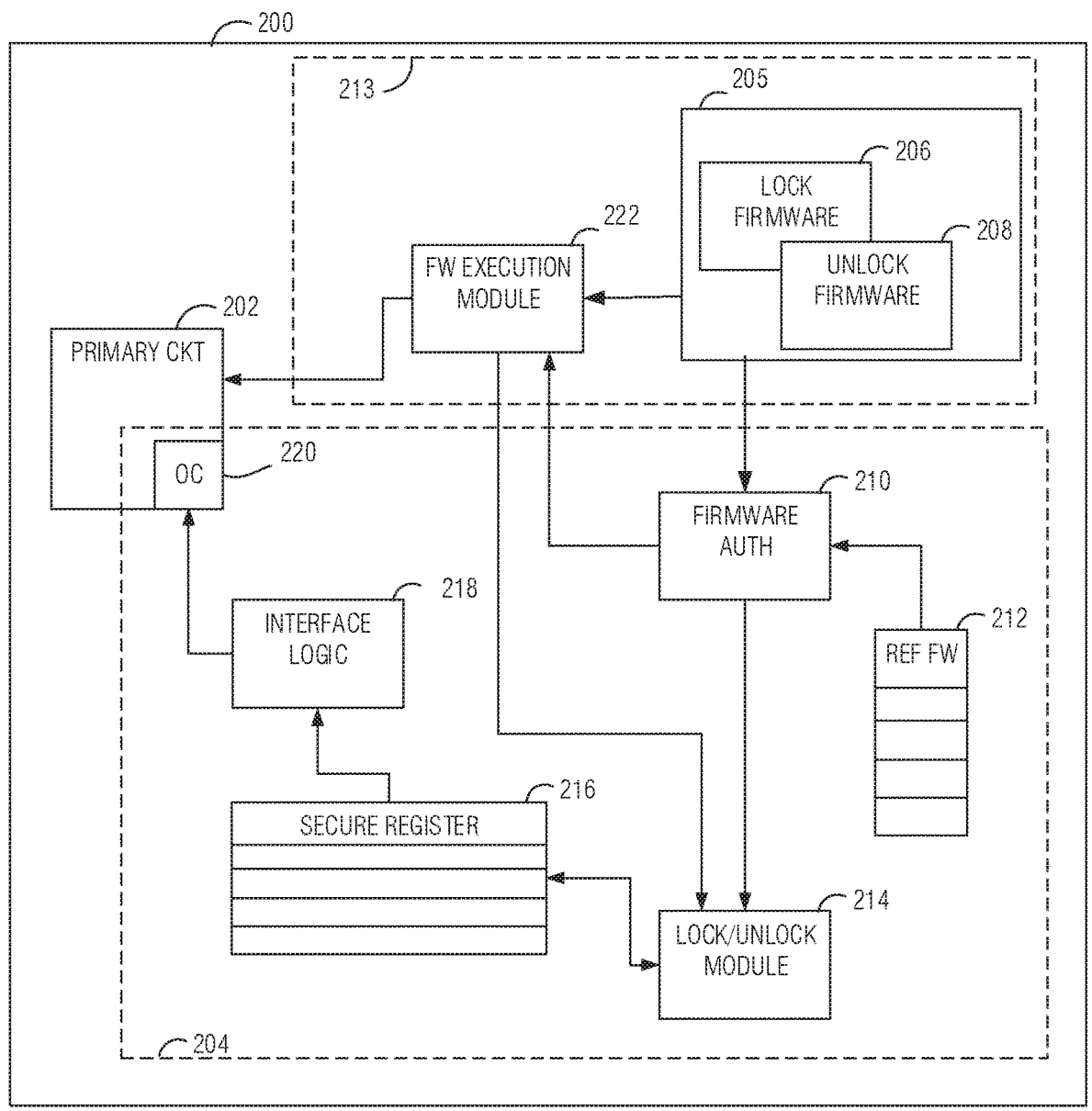
FIG. 2 is a block diagram illustrating an IC provisioned for asset protection according to an embodiment of the invention.

FIG. 2 is a block diagram illustrating an IC provisioned for asset protection according to one embodiment. The IC includes a semiconductor die 200, on which various sub-circuits and modules are formed. These components may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a microcontroller). For example, a machine-readable storage device may include read-only memory (ROM), programmable read-only memory (PROM), random-access memory (RAM), non-volatile memory such as electrically-erasable programmable read-only memory (EEPROM), flash-memory devices, and other suitable storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more hardware processors may be configured by ROM, firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

Primary circuit portion 202 is the primary subject of asset protection. In various embodiments, primary circuit portion 202 may be a microprocessor, a system-on-chip device, an ASIC, or other valuable IC device that may constitute a target for theft in the supply/distribution chain. Primary circuit portion 202 will generally have numerous interfaces to circuitry external to die 200, such as address and data input/output nodes, control nodes, analog-to-digital circuit input or output, audio/video input or output, wireless connectivity, interfaces to firmware storage devices, memory devices, and the like.

In the embodiment illustrated, IC die 200 also includes a secure section 204 on which one or more additional dedicated microcontrollers, data storage devices, and other supporting hardware are formed. The circuitry of secure section 204 may also include input/output connectivity to circuitry external to die 200, though this circuitry is independent from that of primary circuit portion 202. Secure section 204 is a closed-firmware system that runs only authorized firmware that is authorized by an authority, such as a manufacturer of the IC, for example. In addition, although it may include data input/output capability, the operability of secure section 204 itself is under the exclusive control of the authority.

In the embodiment depicted, secure section 204 controls locking and unlocking of primary circuit portion 202. Locking in the present context refers to disabling functionality of primary circuit portion 202 in such a way that no input/output signaling to the IC may re-enable the functionality except for a specific unlock request based on an validated firmware command and unlock key data that are passed to secure section 204 to be acted upon.

Accordingly, lock firmware 206 constituting a lock request, or unlock firmware 208 constituting an unlock request, is written to a non-volatile data store of the IC die 200 that is outside of secure section 204.

Figure 3:
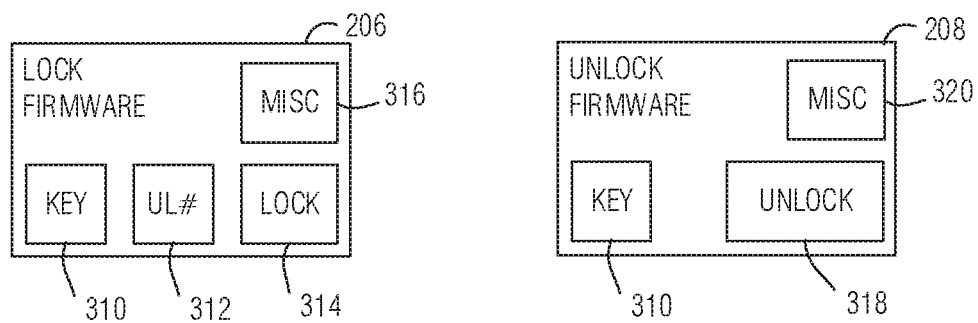
FIG. 3 is a block diagram illustrating contents of lock firmware and unlock firmware according to an embodiment.

FIG. 3 is a block diagram illustrating contents of lock firmware 206 and unlock firmware 208 according to an embodiment. Lock firmware 206 includes an unlock key 310, which may be a cryptographic key, password or passphrase-based value, or the like. In an embodiment, key 310 is shared between a pair of transacting parties to the transfer of a batch of ICs that are protected by locking. Each transaction may be associated with a corresponding key value of unlock key 310. Lock firmware 206 further includes a representation of the lock firmware that is authorized to unlock the IC, such as a hash 312 of unlock firmware 208. Lock firmware 206 further includes machine-executable code containing a lock command 314. Lock firmware 206 may also include additional miscellaneous code 316 that may instruct a microcontroller to perform other functions unrelated to locking or unlocking of the IC.

Unlock firmware 208 according to the embodiment depicted includes a copy of unlock key 310, and code that includes unlock command 318 and, optionally, additional miscellaneous code 320.

Referring again to FIG. 2, lock firmware 206 or unlock firmware 208 is written to firmware data store 205, which may be a non-volatile memory device such as a flash memory device. As depicted, data store 205 is outside of secure section 204. In a related embodiment data store 205 is part of an open-firmware system 213 that accepts custom firmware developed by parties other than the authority. The custom firmware may be subject to authorization by an authority such as the manufacturer of the IC.

Firmware authorization module 210 is programmed, or otherwise configured, to verify the authenticity of the firmware code in lock firmware 206 and unlock firmware 208. In an embodiment, only a portion of each of lock firmware 206 and unlock firmware 208 is verified. For example, with reference to FIG. 3, key 310 may be omitted from the verification. Likewise, unlock firmware hash 312 may be omitted from the verification of lock firmware 206.

Firmware authorization module 210 verifies the content of the lock or unlock firmware 206, 208 before the contents of either firmware are acted upon. Verification includes comparing the firmware written to firmware data store 205 against a reference set of firmware 212. Reference set of firmware 212 according to an embodiment includes signatures (e.g., hashes) of verifiable portions of every pre-authorized version of firmware. The pre-authorization was separately performed by an authority such as the manufacturer of the IC. Accordingly, it will be understood that there may be multiple versions of lock firmware 206 and unlock firmware 208 that may be pre-authorized at any given time. Reference set of firmware 212 may be updated via a secure communication channel with the authority according to a related embodiment.

If the firmware in firmware data store 205 is not validated, a log entry may be made or an error indication to that effect may be issued using a communication module of open-firmware system 213. In response to a positive verification of the authenticity of the firmware code by firmware authorization module 210, further action with respect to the firmware is permitted. The firmware may be loaded for execution by firmware execution module 222 in response to a positive indication of authentication of firmware by firmware authorization module 210. In an embodiment, firmware execution module 222 is part of open-firmware system 213. It may be implemented by a dedicated microcontroller that is bootloaded to first check with firmware authorization module 210 to obtain the authorization status of the firmware stored in firmware data store 205, prior to running any of the firmware in data store 205.

In the embodiment depicted, firmware execution module 222 executes the lock or unlock command 314 or 318, respectively, which may instruct firmware execution module 222 to pass data in the firmware to lock/unlock (LUL) module 214. For instance, the key 310, and unlock firmware hash 312 (where applicable) may be passed to LUL module 214 by firmware execution module 222. Passing of this data to LUL module 214 may involve parsing of the firmware 206 or 208 to locate and extract the key 310 and unlock firmware hash 318 where applicable, and sending those extracted items to LUL module 214 by firmware execution module 222 as part of executing the lock or unlock code portions 314 or 318. In another embodiment, LUL module 214 is notified to read those data portions from the firmware as stored in firmware data store 205 or in a secure shared register, for example.

In a related embodiment, LUL module 214 performs an additional verification of lock firmware 206 to check if the particular code in firmware 206 is authorized to lock the IC. In one example embodiment, the code verification by LUL module 214 utilizes communications circuitry in secure section 204 (not shown) to connect with a server located remotely from the IC and look up the firmware authorization status in a hosted database.

LUL module 214 is further constructed, programmed, or otherwise operative to write lock state indicia to secure register 216 based on the lock command 314 or unlock command 318, as appropriate. Secure register 216 is a non-volatile data store in secure section 204 that may store lock state indicia to be used to lock and unlock primary circuit portion 202. Also, secure register 216 may store unlock criteria to be compared against the data in unlock firmware 208 to authorize the unlocking of the IC. In response to a valid unlock command 318, LUL module 214 compares the unlock criteria to corresponding data in the unlock firmware 208 in order to verify the validity of the unlock firmware 208.

In one type of embodiment, secure register 216 is implemented using non-volatile memory, such as flash or EEPROM memory. In another embodiment, secure register 216 is implemented using a programmable read-only memory (PROM) that may be written only once. In a related embodiment, secure register 216 is implemented using field-programmable fuses, which are also a form of permanent (i.e., one-time-writable) memory. Accordingly, in a related embodiment, secure register 216 may be organized as a set of n-bit registers (with n being 32, 64, 128, etc.), and any new locking operation results in new lock state indicia being saved in a subsequent n-bit register.

Figure 4:
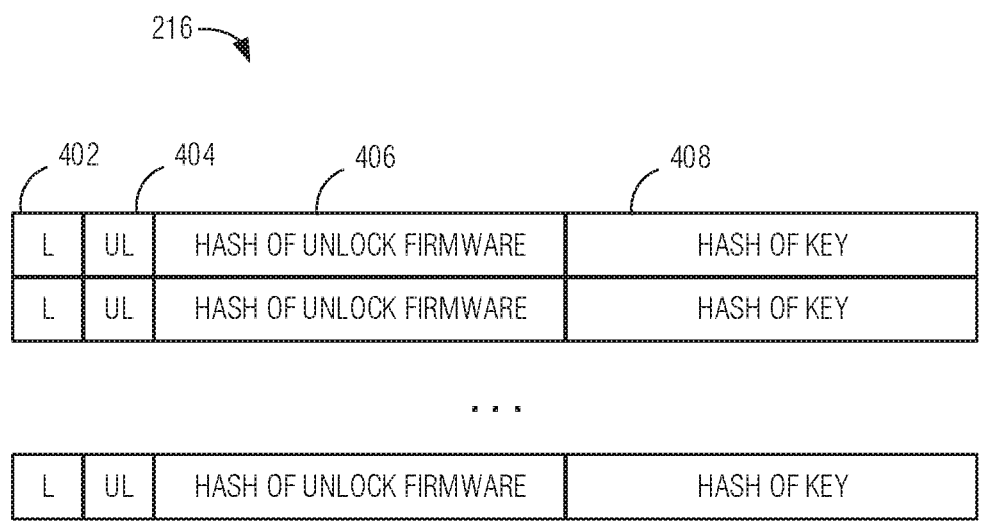
FIG. 4 is a diagram illustrating an exemplary arrangement of a secure register according to an embodiment.

FIG. 4 is a diagram illustrating an exemplary arrangement of secure register 216 according to an embodiment. In this example, secure register 216 utilizes permanent (non-rewritable) memory. Accordingly, there is a lock bit 402 indicating a locked state to be enforced for primary circuit portion 202, and a separate unlock bit 404 that indicates an unlock state to be enforced for primary circuit portion 202. In an embodiment with rewritable memory, a single bit may be used to indicate lock/unlock state, although as will be described below, the use of two bits allows certain security measures to be instituted in related embodiments.

Secure register 216 also stores unlock criteria. In the example as depicted, a series of bits 406 are allocated to storing the hash of unlock firmware 208 as supplied by lock firmware 206. Another series of bits are allocated to storing a hash of the unlock key 310. In a related embodiment, the entire unlock key may be stored given sufficient storage space or key length. As depicted, there may be multiple sets of allocated storage space in secure register 216 to facilitate multiple locking, unlocking, and re-locking operations for embodiments utilizing permanent memory devices.

The content of the lock and unlock bits in secure register 216 controls the lock and unlock states of primary circuit portion 202. In one embodiment, primary circuit portion 202 includes an operability control input 220 into which the desired lock/unlock state is provided. The operability control input 220 may take a variety of different forms according to various embodiments. For example, in an embodiment, the operability control input includes a reset node that, when asserted, maintains the primary circuit portion 202 in a reset state. In another embodiment, the operability control input 220 includes a reset vector address setting that identifies a location of startup code for the primary circuit portion 202. In this embodiment, a reset vector setting indicating a location that is different than a location of valid startup code prevents operation of the primary circuit portion 202.

Interface logic 218 is constructed, or programmed, to read the lock state indicia (e.g., the lock bit 402 and the unlock bit 404) stored in the secure register 216 and, based on a value of that lock state indicia, generate a suitable signal at the operability control input 220 to either place the primary circuit portion 202 in an inoperative state (i.e., locked), or in an operative state (i.e., unlocked).

In an embodiment, interface logic 218 responds to the sequence in which the lock bit 402 and the unlock bit 404 are set. For example:

- If neither the lock bit 402 nor the unlock bit 404 is asserted initially (meaning primary circuit portion 202 is unlocked), and a valid lock command is processed, interface logic 218 locks primary circuit portion 202.
- If the lock bit 402 is asserted and the unlock bit 404 is un-asserted initially (meaning primary circuit portion 202 is locked), and a valid unlock command is processed, interface logic 218 unlocks primary circuit portion 202.
- If both, the lock bit 402, and the unlock bit 404, are asserted initially (meaning primary circuit portion 202 had been locked, and then unlocked), and a valid lock command is processed, interface logic 218 advances a pointer to the next location of secure register 216 and re-locks primary circuit portion 202.

In an embodiment, under normal operation, there is not a case where the lock bit 402 would be un-asserted while unlock bit 404 is asserted. However, in a related embodiment, this setting may be put to some use. For instance, this state may indicate that no further locking is to be performed. This setting may be applied prior to release of the IC into the field to prevent the locking operability from being exploited by malicious actors.

Figure 5:
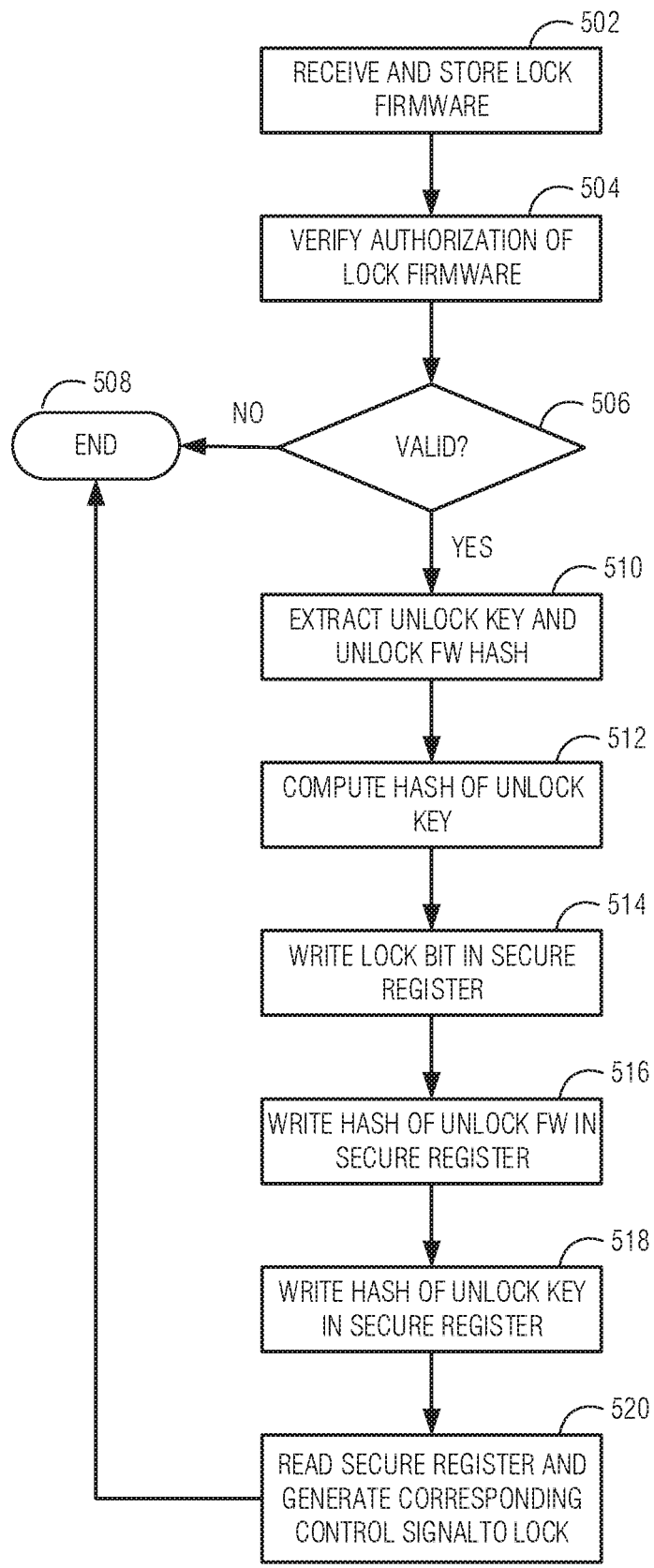
FIG. 5 is a flow diagram illustrating a process of locking a primary circuit portion of an IC according to an embodiment.

FIG. 5 is a flow diagram illustrating a process of locking a primary circuit portion of an IC according to an embodiment. The process may be carried out by auxiliary components of the IC, including at least one auxiliary microprocessor operating under the control of software instructions stored in at least one computer-readable medium, and combinational and sequential digital logic circuitry. At 502, the IC receives and stores lock firmware containing a lock command, as well as an unlock key and a hash of a valid unlock firmware. At 504, the IC verifies if the lock firmware is authorized. As discussed above, verification may involve computing a hash of the firmware, or parts of it, and comparing the result against stored hash values corresponding to authorized firmware. If the result of decision 506 is a non-match indicating the firmware is not valid, then the process ends at 508. Otherwise, the process advances to 510, where the IC extracts the unlock key and the hash of the valid unlock firmware. At 512 a hash of the unlock key is computed. At 514 the lock bit is asserted in a secure register. At 516, the hash of the unlock firmware received in the lock firmware is saved in the secure register, and at 518 the computed hash of the unlock key is also saved in the secure register. At 520, the secure register is read, and a corresponding control signal is generated to lock the primary circuit portion of the IC.

Figure 6:
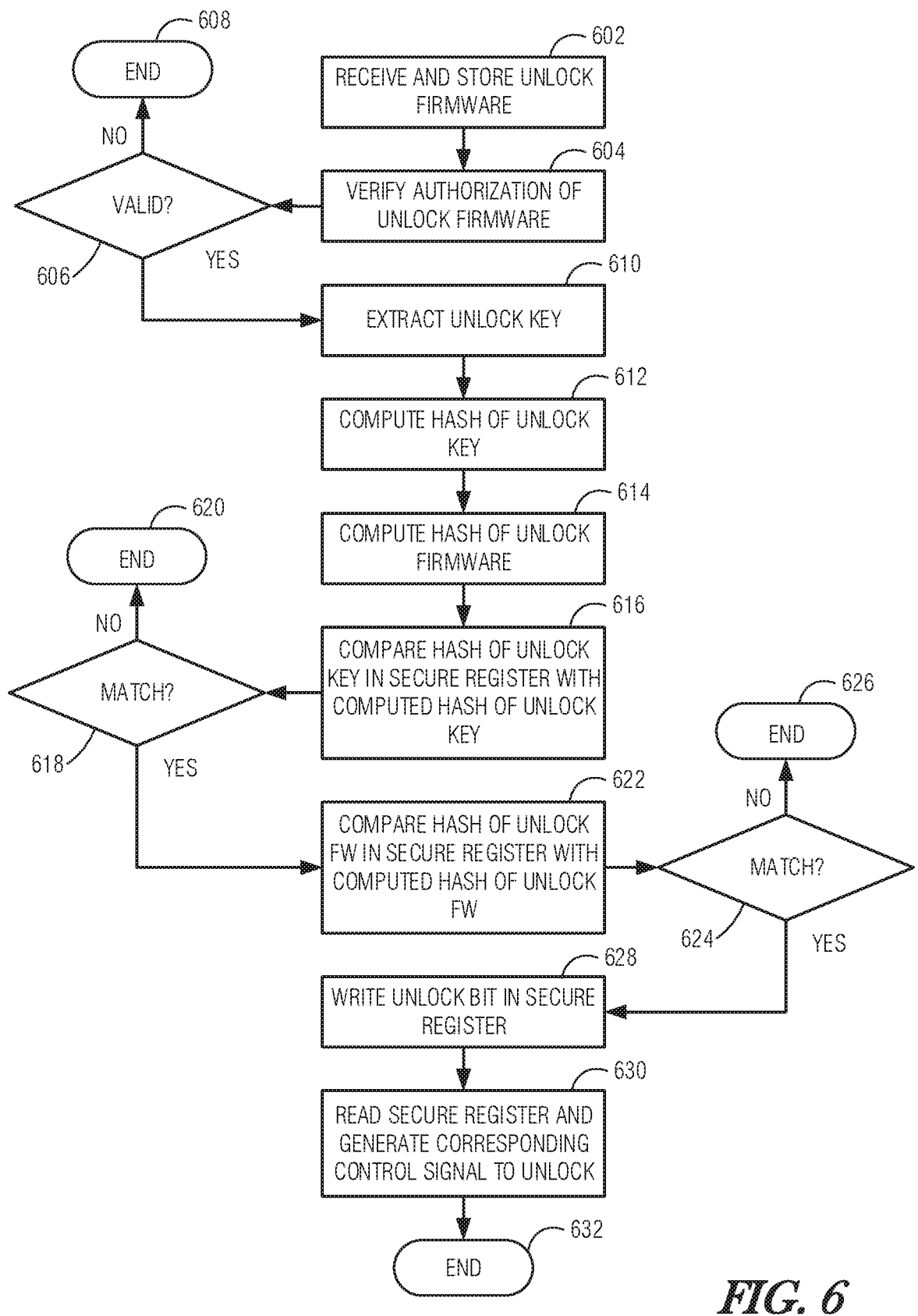
FIG. 6 is a flow chart illustrating a process of unlocking a previously-locked IC according to an embodiment.

FIG. 6 is a flow chart illustrating a process of unlocking a previously-locked IC according to an embodiment. The process may be carried out by auxiliary components of the IC, including at least one auxiliary microprocessor operating under the control of software instructions stored in at least one computer-readable medium, and combinational and sequential digital logic circuitry. At 602, the IC receives and stores unlock firmware containing an unlock command, as well as an unlock key. At 604, the IC verifies if the unlock firmware is valid. As discussed above, verification may involve computing a hash of the firmware, or parts of it, and comparing the result against stored hash values corresponding to authorized firmware. If the result of decision 606 is a non-match indicating the firmware is not valid, then the process ends at 608. Otherwise, the process advances to 610, where the IC extracts the unlock key from the unlock firmware. At 612 a hash of the extracted unlock key is computed.

At 614, a hash of the unlock firmware is computed. At 616 a hash of the unlock key previously written into the secure register is compared against the computed hash of the unlock key that was computed at 612. If decision 618 fails to indicate a match, it means that the requested unlock operation is not authorized and the process ends at 620. If decision 618 validates the unlock key, the process advances to 622, where the hash of the unlock firmware stored in the secure register is compared against the computed hash of the unlock firmware computed at 614. If decision 624 fails to indicate a match, the process concludes at 626. Otherwise, if the unlock firmware is validated at 624, then the process advances to 628, where the unlock bit is written in the secure register in the appropriate location corresponding to the previously-written lock bit. At 630, the updated state of the secure register is read and corresponding unlock signaling is generated to be applied to the primary circuit portion of the IC. As a result, the primary circuit portion is unlocked at the conclusion 632 of this exemplary process.

Additional Notes & Examples

Example 1 is an integrated circuit formed on a semiconductor die and provisioned for asset protection, the integrated circuit comprising: a primary circuit portion including an operability control input through which the primary circuit portion is selectively enabled and disabled; a secure register to store lock state indicia and unlock criteria, wherein a signal at the operability control input is responsive to the lock state indicia; a firmware data store to receive and store firmware code that includes a lock/unlock command, and firmware data that includes an unlock key; an authorization module to verify authenticity of the firmware code; and a lock/unlock (LUL) module operative to write lock state indicia to the secure register based on the lock/unlock command only in response to a positive verification of the authenticity of the firmware code by the authorization module, and to write lock state indicia to the secure register, the lock state indicia enabling the primary circuit portion only in response to the unlock key meeting the unlock criteria.

In Example 2, the subject matter of Example 1 optionally includes, wherein the operability control input includes a reset node that, when asserted, maintains the primary circuit portion in a reset state.

In Example 3, the subject matter of any one or more of Examples 1-2 optionally include, wherein the operability control input includes a reset vector address setting that identifies a location of startup code for the primary circuit portion, wherein a reset vector setting indicating a location that is different than valid startup code prevents operation of the primary circuit portion.

In Example 4, the subject matter of any one or more of Examples 1-3 optionally include, wherein the secure register comprises a plurality of non-volatile data storage elements, wherein each data storage element includes a programmable read-only memory device.

In Example 5, the subject matter of any one or more of Examples 1-4 optionally include, wherein the secure register comprises a plurality of non-volatile data storage elements, wherein each data storage element includes a permanent setting data storage device.

In Example 6, the subject matter of any one or more of Examples 1-5 optionally include, wherein the secure register comprises a plurality of non-volatile data storage elements, wherein each data storage element includes a field-programmable fuse device.

In Example 7, the subject matter of any one or more of Examples 1-6 optionally include, wherein the secure register comprises non-volatile storage for the unlock criteria, and wherein the LUL module is further operative to verify the unlock key against the unlock criteria in response to an unlock command being present in the firmware code.

In Example 8, the subject matter of any one or more of Examples 1-7 optionally include, wherein the lock state indicia includes a first bit indicating a lock state and a second bit indicating an unlock state when the first bit indicates a lock state.

In Example 9, the subject matter of any one or more of Examples 1-8 optionally include, wherein the unlock criteria comprises a hash of the unlock key.

In Example 10, the subject matter of any one or more of Examples 1-9 optionally include, wherein the unlock criteria comprises a first hash of firmware code that contains an unlock command corresponding to firmware code that contains a counterpart lock command, and wherein the LUL module is operative, in response to receipt of firmware code containing an unlock command, to compute a second hash of the received firmware code containing an unlock command, and to write lock state indicia to the secure register that enables the primary circuit portion only in response to the computed hash of the received firmware code matching the hash of the firmware code of the unlock criteria.

In Example 11, the subject matter of any one or more of Examples 1-10 optionally include, wherein the firmware authorization module is electrically coupled to a secure reference firmware data store on the die containing signatures of pre-authorized firmware code, the pre-authorized firmware code having been pre-authorized by a trusted authority.

In Example 12, the subject matter of any one or more of Examples 1-11 optionally include, wherein the firmware authorization module is operative to verify the authenticity of the entirety of the firmware code against a signature representing the firmware code.

In Example 13, the subject matter of any one or more of Examples 1-12 optionally include, further comprising: an interface logic module operative to read the lock state indicia stored in the secure register and, based on a value of the lock state indicia, generate a corresponding signal at the control input.

In Example 14, the subject matter of any one or more of Examples 1-13 optionally include, further comprising: a firmware execution module operative to execute the firmware code only in response to the positive verification of the authenticity of the firmware code, wherein execution of the firmware code includes transferring the firmware data to the LUL module.

In Example 15, the subject matter of any one or more of Examples 1-14 optionally include, wherein the LUL module and the secure register are part of a secure section of the IC, and wherein the firmware data is transferred to the LUL module only in response to a positive verification of the authenticity of the firmware code by the authorization module.

In Example 16, the subject matter of any one or more of Examples 1-15 optionally include, wherein the LUL and the authorization module are implemented utilizing an auxiliary microprocessor executing protected code.

In Example 17, the subject matter of any one or more of Examples 1-16 optionally include, wherein the primary circuit portion is a microprocessor, and wherein the authorization module and LUL module are implemented on an auxiliary microcontroller circuit.

In Example 18, the subject matter of any one or more of Examples 1-17 optionally include, wherein the primary circuit portion is a system-on-chip (SoC) device, and wherein the authorization module and LUL module are implemented on an auxiliary microcontroller circuit.

In Example 19, the subject matter of any one or more of Examples 1-18 optionally include, wherein the authorization module is implemented on a first dedicated microcontroller and LUL module is implemented using a second dedicated microcontroller.

Example 20 is a method for locking a primary circuit portion of an integrated circuit (IC) provisioned for asset protection, the method comprising: maintaining, by a secondary circuit portion of the IC, a secure register for storing lock state indicia and unlock criteria; receiving, by the secondary circuit portion of the IC, lock firmware code that includes a lock command, and firmware data that includes an unlock key; verifying, by the secondary circuit portion, authenticity of the lock firmware code; writing, by the secondary circuit portion of the IC, (a) lock state indicia based on the lock command, and (b) unlock criteria based on the unlock key, the writing being performed only in response to a positive verification of the authenticity of the firmware code; and disabling, by the secondary circuit portion of the IC, the primary circuit portion in response to the lock state indicia written in the secure register.

In Example 21, the subject matter of Example 20 optionally includes, wherein disabling the primary circuit portion includes asserting a reset node of the primary circuit portion that maintains the primary circuit portion in a reset state.

In Example 22, the subject matter of any one or more of Examples 20-21 optionally include, wherein disabling the primary circuit portion includes changing a reset vector address setting that identifies a location of startup code for the primary circuit portion.

In Example 23, the subject matter of any one or more of Examples 20-22 optionally include, wherein maintaining the secure register includes maintaining a plurality of non-volatile data storage elements, each data storage element including a programmable read-only memory device.

In Example 24, the subject matter of any one or more of Examples 20-23 optionally include, wherein maintaining the secure register comprises a maintaining a plurality of non-volatile data storage elements, each data storage element including a permanent setting data storage device.

In Example 25, the subject matter of any one or more of Examples 20-24 optionally include, wherein maintaining the secure register comprises maintaining a plurality of non-volatile data storage elements, wherein each data storage element includes a field-programmable fuse device.

In Example 26, the subject matter of any one or more of Examples 20-25 optionally include, wherein writing the lock state indicia includes writing a first bit indicating a lock state that is independent of a second bit indicating an unlock state for the primary circuit portion.

In Example 27, the subject matter of any one or more of Examples 20-26 optionally include, wherein writing the unlock criteria comprises writing a hash of the unlock key in the secure register.

In Example 28, the subject matter of any one or more of Examples 20-27 optionally include, wherein writing the unlock criteria comprises writing a hash of unlock firmware code that contains an unlock command corresponding to the lock command.

In Example 29, the subject matter of any one or more of Examples 20-28 optionally include, wherein verifying the authenticity of the lock firmware code includes computing a signature of the lock firmware code and comparing the computed signature against a set of signatures of pre-authorized firmware code, the pre-authorized firmware code having been pre-authorized by a trusted authority.

In Example 30, the subject matter of any one or more of Examples 20-29 optionally include, wherein verifying the authenticity of the lock firmware code includes verifying authenticity of the entirety of the lock firmware code against a signature representing the lock firmware code.

In Example 31, the subject matter of any one or more of Examples 20-30 optionally include, further comprising: executing, by the secondary circuit portion, the lock firmware code only in response to the positive verification of the authenticity of the lock firmware code, wherein execution of the firmware code causes transferring of the firmware data to a secure section of the secondary circuit portion from a storage location outside of the secure section of the secondary circuit portion.

Example 32 is a method for unlocking a primary circuit portion of an integrated circuit (IC) provisioned for asset protection, the method comprising: maintaining, by a secondary circuit portion of the IC, a secure register for storing lock state indicia and unlock criteria; receiving, by the secondary circuit portion of the IC, unlock firmware code that includes an unlock command, and firmware data that includes an unlock key; verifying, by the secondary circuit portion, authenticity of the unlock firmware code; in response to a positive verification of the authenticity of the unlock firmware code, validating, by the secondary circuit portion, the unlock key from the received firmware data; writing, by the secondary circuit portion of the IC, lock state indicia based on the unlock command, the writing being performed only in response to a positive verification of the authenticity of the firmware code and a positive validation of the unlock key; and enabling, by the secondary circuit portion of the IC, the primary circuit portion in response to the lock state indicia written in the secure register.

In Example 33, the subject matter of Example 32 optionally includes, wherein enabling the primary circuit portion includes de-asserting a reset node of the primary circuit portion that maintains the primary circuit portion in a reset state.

In Example 34, the subject matter of any one or more of Examples 32-33 optionally include, wherein enabling the primary circuit portion includes restoring a reset vector address setting that identifies a location of startup code for the primary circuit portion.

In Example 35, the subject matter of any one or more of Examples 32-34 optionally include, wherein maintaining the secure register includes maintaining a plurality of non-volatile volatile data storage elements, each data storage element including a programmable read-only memory device.

In Example 36, the subject matter of any one or more of Examples 32-35 optionally include, wherein maintaining the secure register comprises a maintaining a plurality of non-volatile data storage elements, each data storage element including a permanent setting data storage device.

In Example 37, the subject matter of any one or more of Examples 32-36 optionally include, wherein maintaining the secure register comprises maintaining a plurality of non-volatile data storage elements, wherein each data storage element includes a field-programmable fuse device.

In Example 38, the subject matter of any one or more of Examples 32-37 optionally include, wherein writing the lock state indicia includes writing a second bit indicating an unlock state that is independent of a first bit indicating a lock state for the primary circuit portion.

In Example 39, the subject matter of any one or more of Examples 32-38 optionally include, wherein validating the unlock key includes comparing a hash of the unlock key against the unlock criteria stored in the secure register.

In Example 40, the subject matter of any one or more of Examples 32-39 optionally include, wherein the unlock criteria stored in the secure register includes a hash of the unlock firmware code, and further comprising: validating the unlock firmware code based on computing a hash of the unlock firmware code received against the hash of the unlock firmware code stored in the secure register as part of the unlock criteria.

In Example 41, the subject matter of any one or more of Examples 32-40 optionally include, wherein verifying the authenticity of the unlock firmware code includes computing a signature of the unlock firmware code and comparing the computed signature against a set of signatures of pre-authorized firmware code, the pre-authorized firmware code having been pre-authorized by a trusted authority.

In Example 42, the subject matter of any one or more of Examples 32-41 optionally include, wherein verifying the authenticity of the unlock firmware code includes verifying authenticity of the entirety of the unlock firmware code against a signature representing the unlock firmware code.

In Example 43, the subject matter of any one or more of Examples 32-42 optionally include, further comprising: executing, by the secondary circuit portion, the unlock firmware code only in response to the positive verification of the authenticity of the unlock firmware code, wherein execution of the unlock firmware code causes transferring of the firmware data to a secure section of the secondary circuit portion from a storage location outside of the secure section of the secondary circuit portion.

Example 44 is an integrated circuit (IC) provisioned for asset protection, the IC comprising: a primary circuit portion subject to being selectively locked and unlocked; a secure data storage means for storing lock state indicia and unlock criteria, wherein means for locking and unlocking the primary circuit portion are responsive to the lock state indicia; means for receiving lock/unlock firmware code that includes a lock/unlock command, and firmware data that includes an unlock key; means for verifying authenticity of the lock/unlock firmware code; means for validating the unlock key from the received firmware data in response to a positive verification of the authenticity of the lock/unlock firmware code; means for writing lock state indicia based on the lock/unlock command, the writing being performed only in response to a positive verification of the authenticity of the lock/unlock firmware code and, in the case of an unlock command, a positive validation of the unlock key; and means for enabling/disabling the primary circuit portion in response to the lock state indicia written in the secure data storage means.

In Example 45, the subject matter of Example 44 optionally includes, wherein the means for enabling/disabling the primary circuit portion include means for asserting and de-asserting a reset node of the primary circuit portion that maintains the primary circuit portion in a reset state.

In Example 46, the subject matter of any one or more of Examples 44-45 optionally include, wherein the means for enabling/disabling the primary circuit portion include means for restoring a reset vector address setting that identifies a location of startup code for the primary circuit portion.

In Example 47, the subject matter of any one or more of Examples 44-46 optionally include, wherein the secure data storage means includes a plurality of non-volatile data storage elements, each data storage element including a programmable read-only memory device.

In Example 48, the subject matter of any one or more of Examples 44-47 optionally include, wherein the secure data storage means comprises a plurality of non-volatile data storage elements, each data storage element including a permanent setting data storage device.

In Example 49, the subject matter of any one or more of Examples 44-48 optionally include, wherein the secure data storage means comprises a plurality of non-volatile data storage elements, wherein each data storage element includes a field-programmable fuse device.

In Example 50, the subject matter of any one or more of Examples 44-49 optionally include, wherein the means for writing the lock state indicia includes means for writing a first bit indicating a lock state, and a second bit indicating an unlock state that is independent of a first bit.

In Example 51, the subject matter of any one or more of Examples 44-50 optionally include, wherein the means for validating the unlock key includes means for comparing a hash of the unlock key against the unlock criteria stored in the secure data storage means.

In Example 52, the subject matter of any one or more of Examples 44-51 optionally include, wherein the unlock criteria stored in the secure data storage means includes a hash of the unlock firmware code, and further comprising: means for validating the unlock firmware code based on computing a hash of the unlock firmware code received against the hash of the unlock firmware code stored in the secure data storage means as part of the unlock criteria.

In Example 53, the subject matter of any one or more of Examples 44-52 optionally include, wherein the means for verifying the authenticity of the lock/unlock firmware code includes means for computing a signature of the lock/unlock firmware code and comparing the computed signature against a set of signatures of pre-authorized firmware code, the pre-authorized firmware code having been pre-authorized by a trusted authority.

In Example 54, the subject matter of any one or more of Examples 44-53 optionally include, wherein the means for verifying the authenticity of the lock/unlock firmware code includes means for verifying authenticity of the entirety of the lock/unlock firmware code against a signature representing the lock/unlock firmware code.

In Example 55, the subject matter of any one or more of Examples 44-54 optionally include, further comprising: means for executing the lock/unlock firmware code only in response to the positive verification of the authenticity of the lock/unlock firmware code, wherein execution of the firmware code causes transferring of the firmware data to a secure section of the IC from a storage location outside of the secure section of the IC.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein," Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An integrated circuit formed on a semiconductor die and provisioned for asset protection, the integrated circuit comprising:
   a firmware data store to receive and store firmware code that includes a lock/unlock command, and firmware data that includes an unlock key;
   an authorization sub-circuit to verify authenticity of the firmware code; and
   a lock/unlock (LUL) sub-circuit operative to write lock state indicia to a secure register based on the lock/unlock command only in response to a positive verification of the authenticity of the firmware code by the authorization sub-circuit, and to write lock state indicia to the secure register, the lock state indicia enabling a primary circuit portion only in response to the unlock key meeting the unlock criteria, the primary circuit portion including an operability control input through which the primary circuit portion is selectively enabled and disabled based on the lock state indicia, and wherein the operability control input includes a reset vector address setting that identifies a location of startup code for the primary circuit portion, wherein a reset vector setting indicating a location that is different than valid startup code prevents operation of the primary circuit portion.

2. The integrated circuit of claim 1, wherein the operability control input includes a reset node that, when asserted, maintains the primary circuit portion in a reset state.

3. The integrated circuit of claim 1, wherein the secure register comprises a plurality of non-volatile data storage elements, wherein each data storage element includes a permanent setting data storage device.

4. The integrated circuit of claim 1, wherein the secure register comprises a plurality of non-volatile data storage elements, wherein each data storage element includes a programmable read-only memory device.

5. The integrated circuit of claim 1, wherein the secure register comprises a plurality of non-volatile data storage elements, wherein each data storage element includes a field-programmable fuse device.

6. The integrated circuit of claim 1, wherein the secure register comprises non-volatile storage for the unlock criteria, and wherein the LUL sub-circuit is further operative to verify the unlock key against the unlock criteria in response to an unlock command being present in the firmware code.

7. The integrated circuit of claim 1, wherein the lock state indicia includes a first bit indicating a lock state and a second bit indicating an unlock state when the first bit indicates a lock state.

8. The integrated circuit of claim 1, wherein the unlock criteria comprises a hash of the unlock key.

9. The integrated circuit of claim 1, wherein the unlock criteria comprises a first hash of firmware code that contains an unlock command corresponding to firmware code that contains a counterpart lock command, and wherein the LUL sub-circuit is operative, in response to receipt of firmware code containing an unlock command, compute a second hash of the received firmware code containing an unlock command, and to write lock state indicia to the secure register that enables the primary circuit portion only in response to the computed hash of the received firmware code matching the hash of the firmware code of the unlock criteria.

10. The integrated circuit of claim 1, wherein the firmware authorization sub-circuit is operative to verify the authenticity of the entirety of the firmware code against a signature representing the firmware code.

11. The integrated circuit of claim 1, further comprising:
an interface logic sub-circuit operative to read the lock state indicia stored in the secure register and, based on a value of the lock state indicia, generate a corresponding signal at the control input.

12. The integrated circuit of claim 1, further comprising:
a firmware execution sub-circuit operative to execute the firmware code only in response to the positive verification of the authenticity of the firmware code, wherein execution of the firmware code includes transferring the firmware data to the LUL sub-circuit.

13. The integrated circuit of claim 1, wherein the primary circuit portion is a microprocessor, and wherein the authorization sub-circuit and LUL sub-circuit are implemented on an auxiliary microcontroller circuit.

14. The integrated circuit of claim 1, wherein the primary circuit portion is a system-on-chip (SoC) device, and wherein the authorization sub-circuit and LUL sub-circuit are implemented on an auxiliary microcontroller circuit.

15. A method for locking a primary circuit portion of an integrated circuit (IC) provisioned for asset protection, the method comprising:
receiving, by a secondary circuit portion of the IC, lock firmware code that includes a lock command, and firmware data that includes an unlock key;
verifying, by the secondary circuit portion, authenticity of the lock firmware code;
writing, by the secondary circuit portion of the IC, to a secure register for storing lock state indicia and unlock criteria, (a) lock state indicia based on the lock command, and (b) unlock criteria based on the unlock key, the writing being performed only in response to a positive verification of the authenticity of the firmware code; and
disabling, by the secondary circuit portion of the IC, the primary circuit portion in response to the lock state indicia written in the secure register,
wherein the primary circuit portion including an operability control input through which the primary circuit portion is selectively enabled and disabled based on the lock state indicia, and
wherein the operability control input includes a reset vector address setting that identifies a location of startup code for the primary circuit portion, wherein a reset vector setting indicating a location that is different than valid startup code prevents operation of the primary circuit portion.

16. The method of claim 15, wherein writing the lock state indicia includes writing a first bit indicating a lock state that is independent of a second bit indicating an unlock state for the primary circuit portion.

17. The method of claim 15, wherein writing the unlock criteria comprises writing a hash of the unlock key in the secure register.

18. The method of claim 15, wherein writing the unlock criteria comprises writing a hash of unlock firmware code that contains an unlock command corresponding to the lock command.

19. The method of claim 15, wherein verifying the authenticity of the lock firmware code includes verifying authenticity of the entirety of the lock firmware code against a signature representing the lock firmware code.

* * * * *